(12) United States Patent
Taylor et al.

(10) Patent No.: US 12,225,382 B2
(45) Date of Patent: Feb. 11, 2025

(54) CONNECTED HELMET SYSTEM AND METHOD OF OPERATING THE SAME

(71) Applicant: Polaris Industries Inc., Medina, MN (US)

(72) Inventors: Scott D. Taylor, Blaine, MN (US); Troy D. Kendrick, Minnetrista, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/544,834

(22) Filed: Dec. 19, 2023

(65) Prior Publication Data

US 2024/0137771 A1 Apr. 25, 2024

Related U.S. Application Data

(63) Continuation of application No. 17/382,937, filed on Jul. 22, 2021, now Pat. No. 11,902,790, which is a
(Continued)

(51) Int. Cl.
| | |
|---|---|
| *H04W 12/50* | (2021.01) |
| *A42B 3/04* | (2006.01) |
| *A42B 3/30* | (2006.01) |
| *B60R 16/023* | (2006.01) |
| *H04B 1/3827* | (2015.01) |

(Continued)

(52) U.S. Cl.
CPC .......... *H04W 12/50* (2021.01); *A42B 3/0433* (2013.01); *A42B 3/30* (2013.01); *B60R 16/0231* (2013.01); *H04B 1/385* (2013.01); *H04W 4/40* (2018.02); *H04W 4/80* (2018.02); *H04W 12/68* (2021.01); *H04B 2001/3866* (2013.01)

(58) Field of Classification Search
None
See application file for complete search history.

(56) References Cited

U.S. PATENT DOCUMENTS

| | | |
|---|---|---|
| 9,162,548 B1 | 10/2015 | Wakeman |
| 9,399,398 B1 | 7/2016 | Logan et al. |

(Continued)

FOREIGN PATENT DOCUMENTS

| | | |
|---|---|---|
| CN | 1325799 A | 12/2001 |
| CN | 203087671 U | 7/2013 |

(Continued)

OTHER PUBLICATIONS

Chinese Office Action dated Jan. 8, 2024 in corresponding Chinese Application No. 202210280131.4.
(Continued)

*Primary Examiner* — Thomas S McCormack
(74) *Attorney, Agent, or Firm* — Harness, Dickey & Pierce, P.L.C.

(57) ABSTRACT

A programming device includes an application for programming vehicle function settings of a vehicle. The programming device has a transmitter that communicates the vehicle function settings through a vehicle receiver to a vehicle controller. The vehicle function settings cause the controller to operate the vehicle when a device identifier is received from a moveable device associated with a vehicle user.

20 Claims, 11 Drawing Sheets

Related U.S. Application Data continuation of application No. 16/668,980, filed on Oct. 30, 2019, now Pat. No. 11,102,654.

(60) Provisional application No. 62/754,116, filed on Nov. 1, 2018.

(51) Int. Cl.
  *H04W 4/40* (2018.01)
  *H04W 4/80* (2018.01)
  *H04W 12/68* (2021.01)

(56) References Cited

U.S. PATENT DOCUMENTS

| | | | |
|---|---|---|---|
| 9,550,418 | B1 | 1/2017 | Logan et al. |
| 9,604,651 | B1 | 3/2017 | Amireddy et al. |
| 9,769,638 | B2 | 9/2017 | Alsayyed Ahmad et al. |
| 11,102,654 | B2 | 8/2021 | Taylor et al. |
| 2008/0220718 | A1 | 9/2008 | Sakamoto et al. |
| 2009/0002161 | A1 | 1/2009 | Luciani |
| 2013/0041525 | A1 | 2/2013 | Tomberlin |
| 2016/0347280 | A1 | 12/2016 | Daman et al. |
| 2017/0057591 | A1 | 3/2017 | Bender et al. |
| 2017/0104865 | A1* | 4/2017 | Skelton ............... H04M 1/6075 |
| 2017/0136875 | A1 | 5/2017 | Logan et al. |
| 2017/0288718 | A1 | 10/2017 | Rudrappa |

FOREIGN PATENT DOCUMENTS

| | | |
|---|---|---|
| CN | 103802626 A | 5/2014 |
| CN | 103857544 A | 6/2014 |
| CN | 104838166 A | 8/2015 |
| CN | 105320277 A | 2/2016 |
| CN | 105867335 A | 8/2016 |
| CN | 105867355 A | 8/2016 |
| CN | 106458158 A | 2/2017 |
| CN | 107027096 A | 8/2017 |
| CN | 107407294 A | 11/2017 |
| WO | WO-2005/110138 A1 | 11/2005 |
| WO | WO-2016074017 A1 | 5/2016 |
| WO | WO-2016206693 A1 | 12/2016 |

OTHER PUBLICATIONS

Chinese Office Action dated May 28, 2024 in corresponding Chinese Application No. 202210280131.4.
International Search Report and Written Opinion dated Feb. 28, 2020 in corresponding PCT Application No. PCT/US2019/059071.
Chinese Office Action dated Apr. 24, 2022 in corresponding Chinese Application No. 201980071919.0.
Canadian Office Action dated Feb. 9, 2023 in corresponding Canadian Application No. 3144462.

* cited by examiner

CONNECTED HELMET SYSTEM AND METHOD OF OPERATING THE SAME

CROSS-REFERENCE TO RELATED APPLICATIONS

This application is a continuation of U.S. Patent Applications No. continuation of U.S. patent application Ser. No. 17/382,937, filed on Jul. 22, 2021, which claims priority to U.S. patent application Ser. No. 16/668,980 filed on Oct. 30, 2019 (now U.S. Pat. No. 11,102,654), which claims the benefit of U.S. Provisional Application No. 62/754,116, filed on Nov. 1, 2018. The entire disclosures of the above applications are incorporated herein by reference.

FIELD

The present disclosure relates to a helmet for use with a vehicle and, more particularly, to a helmet that allows function settings to be communicated to a vehicle operating system.

BACKGROUND

This section provides background information related to the present disclosure which is not necessarily prior art.

All-terrain vehicles, snowmobiles and other types of off road vehicles may be used by adults and children alike. Certain vehicles allow the user to adjust settings through menu displays at the vehicle. However, multiple users may use a vehicle and thus a user's favorite settings must be adjusted if another user changes them.

Because various types of off road vehicles are also used by children, parents may wish to restrict the operation of various functions of the vehicles. However, no known way to restrict such functions is known.

SUMMARY

This section provides a general summary of the disclosures, and is not a comprehensive disclosure of its full scope or all of its features.

The present disclosure provides a system for adjusting operation functions of a vehicle to be set and adjusted as the driver operates or approaches a vehicle from stored setting communicated from a helmet.

In one aspect of the disclosures a system comprises a controller and a vehicle controller disposed within a vehicle. A helmet communicates an identifier to the vehicle. The controller enables the vehicle to start in response to the identifier.

In another aspect of the disclosure, a helmet for communicating with a vehicle function controller has a first memory, a first transmitter, a first receiver and a first controller in communication with the first memory, the first transmitter and the first receiver. The first receiver receives a plurality of vehicle function settings. The first memory stores the vehicle function settings within a memory of the helmet. The first transmitter communicates the vehicle function settings from the first memory to the vehicle function controller.

In yet another aspect of the disclosure, a method includes receiving a plurality of vehicle function settings at a first receiver disposed within a helmet, storing the vehicle function settings within a first memory of the helmet, communicating the vehicle function settings to a vehicle function controller using a first transmitter disposed within the helmet, receiving the vehicle function settings a second receiver associated with a vehicle function controller, storing the vehicle function settings within a second memory associated with a vehicle function controller and controlling a vehicle function in response to the vehicle function settings.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected examples and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Although the following description includes several examples of a motorcycle application, it is understood that the features herein may be applied to any appropriate vehicle, such as snowmobiles, all-terrain vehicles, utility vehicles, moped, automobiles, scooters, etc. The examples disclosed below are not intended to be exhaustive or to limit the disclosure to the precise forms disclosed in the following detailed description. Rather, the examples are chosen and described so that others skilled in the art may utilize their teachings.

The present disclosure provides a system that uses a helmet and electronics within the helmet to communicate function settings to a controller of a vehicle. By providing and storing function settings within the helmet, the functions settings of the vehicle may be updated and operated accordingly. The function settings are a type of data that correspond to a range of desired operation for a particular function. The function setting may set a maximum or minimum for a function (e.g., speed, radio volume). The function settings may set a geographical boundary or desired presets (one or more data values) for a function (e.g., radio setting, suspension pre-height).

Figure 1:
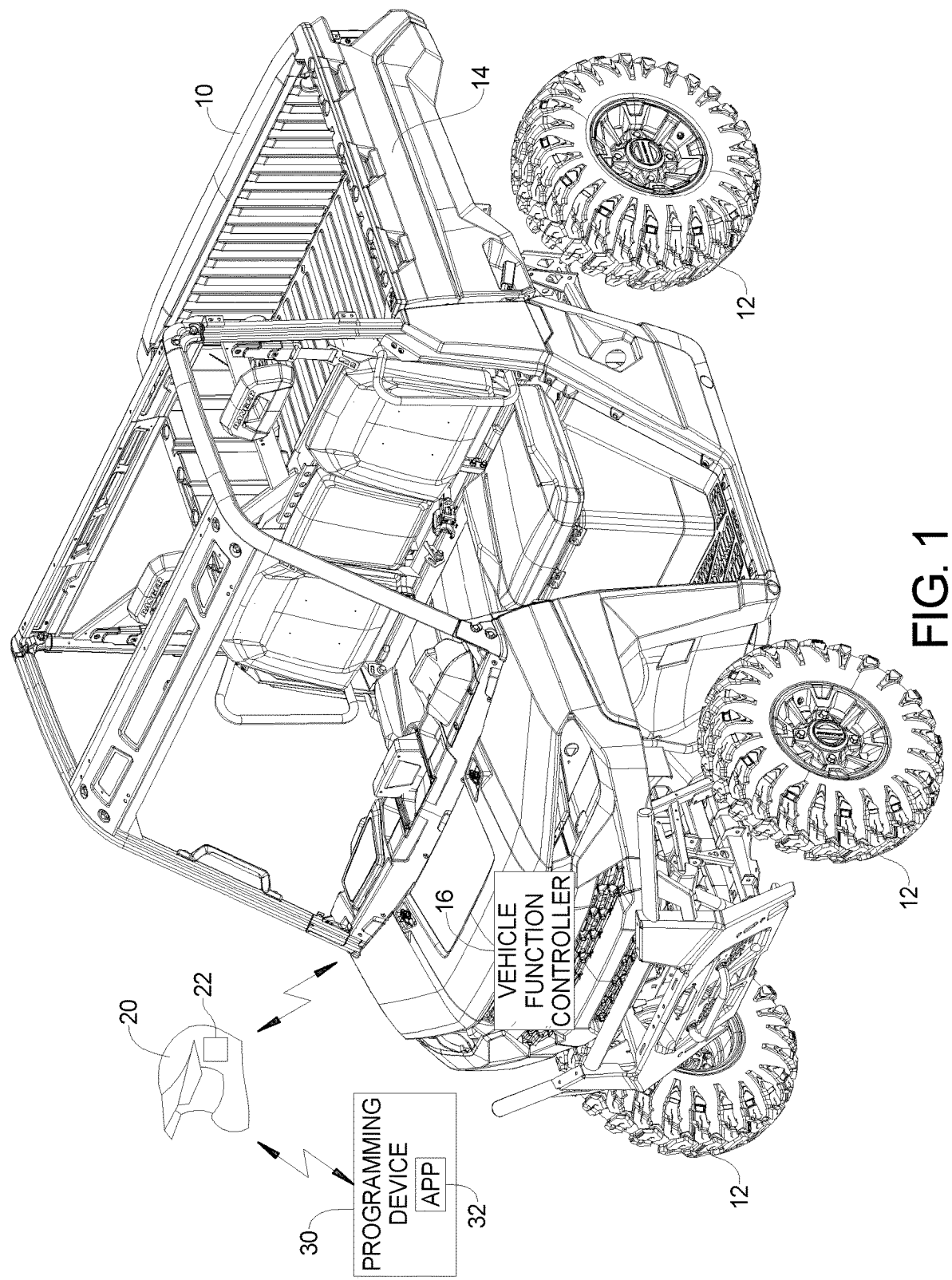
FIG. 1 is a perspective view of a vehicle setting system according to the present disclosure.

Referring now to FIG. 1, a vehicle 10 such as a utility vehicle is illustrated having wheels 12 and a body 14 that houses a vehicle function controller 16. The vehicle function controller 16 is in communication with a helmet 20. The helmet 20 includes a helmet control system 22. A programming device 30 includes an application 32 used for programming limits for the functions of the vehicle 10 and communicating the data corresponding thereto to the helmet control system 22.

Figure 2:
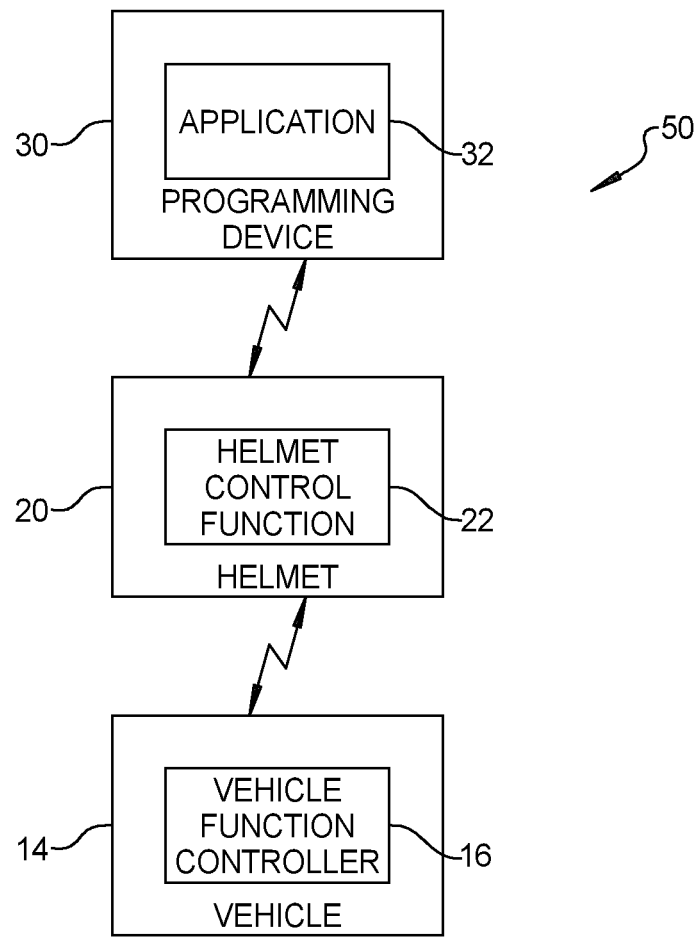
FIG. 2 is block diagrammatic view of the function control system according to the present disclosure.

Referring now to FIG. 2, a block diagrammatic view of the vehicle function control system 50 of vehicle 10 is illustrated having a vehicle function controller 16. The vehicle function controller 16 is in communication with the helmet control system 22 of the helmet 20. The programming device 30 has an application 32 for communicating or causing the programming device to communicate with the helmet control system 22. The programming device 30 may enable or disable a helmet from interacting with the vehicle function controller 16. Details of the communication functions are set forth in further detail below.

Figure 3:
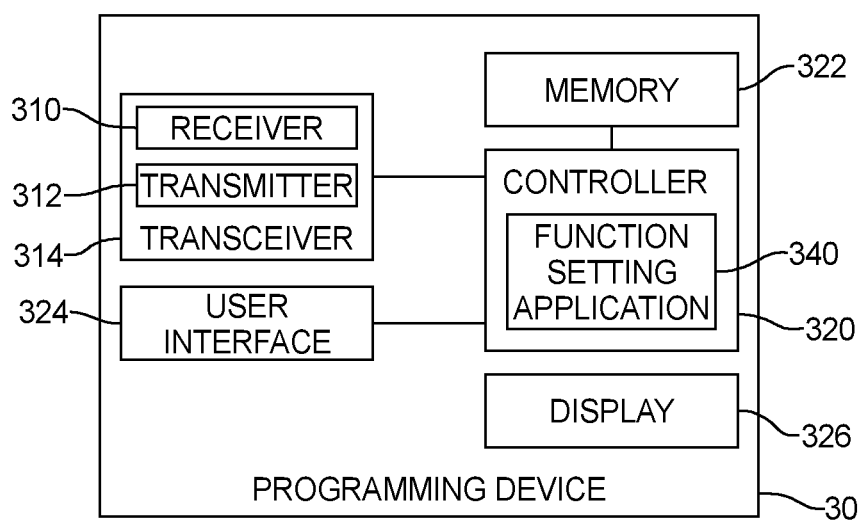
FIG. 3 is a block diagrammatic view of a programming device according to the present disclosure.

Referring now to FIG. 3, a programming device 30 is illustrated in further detail. The programming device 30 may be a cellular phone, a tablet, a computer or another type of device. The programming device 30 includes a receiver 310 and a transmitter 312, both of which may be included within a transceiver 314. That is, the receiver 310 and transmitter 312 may be formed on a single chip and may be referred to as the transceiver 314. However, a separate receiver 310 and a separate transmitter 312 may be provided within the programming device. The receiver 310 and the transmitter may use various types of technologies including Bluetooth, Wi-Fi, short range or long range communications, cellular communications or the like for communicating with the helmet and the vehicle function controller. The programming device includes a controller 320. The controller 320 may be a microcomputer or discreet circuitry. The controller 320 is in communication with a memory 322 such as a solid state device or a hard drive.

Controller 320 may also be in communication with a user interface 324. The user interface 324 is used for communicating signals to the controller 320. The user interface 324 may comprise a series of buttons, switches or dials and may include a keyboard. The user interface 324 provides various types of signals for controlling the function settings.

A display 326 may also be in communication with the controller 320. The display 326 may be a touchscreen display which also acts as a user interface. The display 326 displays various settings and queries for making these settings. In conjunction with the user interface 324, various display items may be selected or adjusted as described in more detail below. The controller 320 receives the selection signals from the user interface 324 so that the control function settings are stored within the memory 322.

The controller 320 may include a limitation application 340 may be used to generate the display and receive and communicate various menus so that different types of function limitations may be selected. The function limitations may take the form of data stored within the memory 322.

Figure 4A:
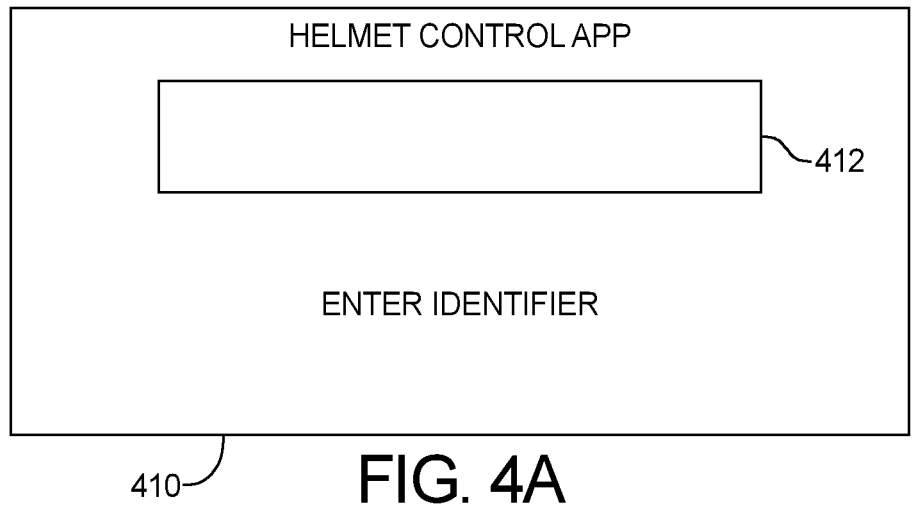
FIG. 4A is an initial helmet control application screen example.

Referring now to FIG. 4A, the limitation application 340 may manifest itself within a screen display 410. Screen display 410 may provide a method for secure access to the application by requesting an identifier to be entered within the box 412. The identifier may be entered using the user interface 324 illustrated in FIG. 3. The display 410 itself may be used if a touch screen display is provided.

Figure 4B:
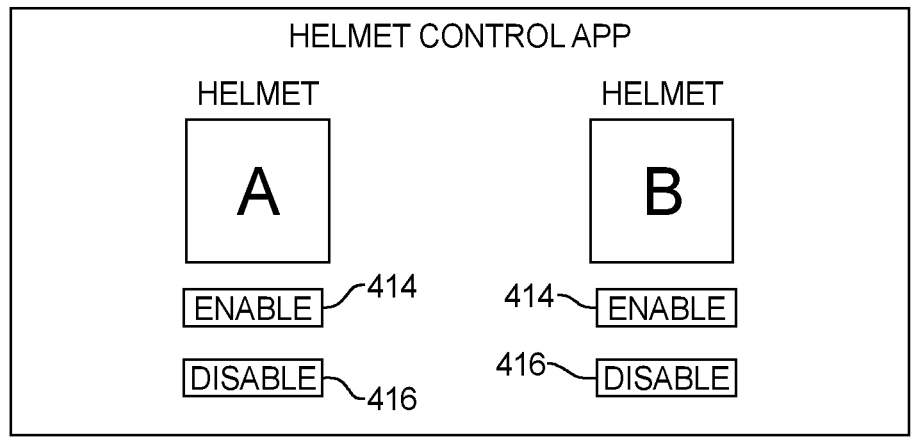
FIG. 4B is a screen display for enabling or disabling various helmets for a system.

Referring now to FIG. 4B, the system may use an enable box 414 or a disable box 416 to enable various helmets, two of which "A" and "B" are set forth.

Figure 4C:
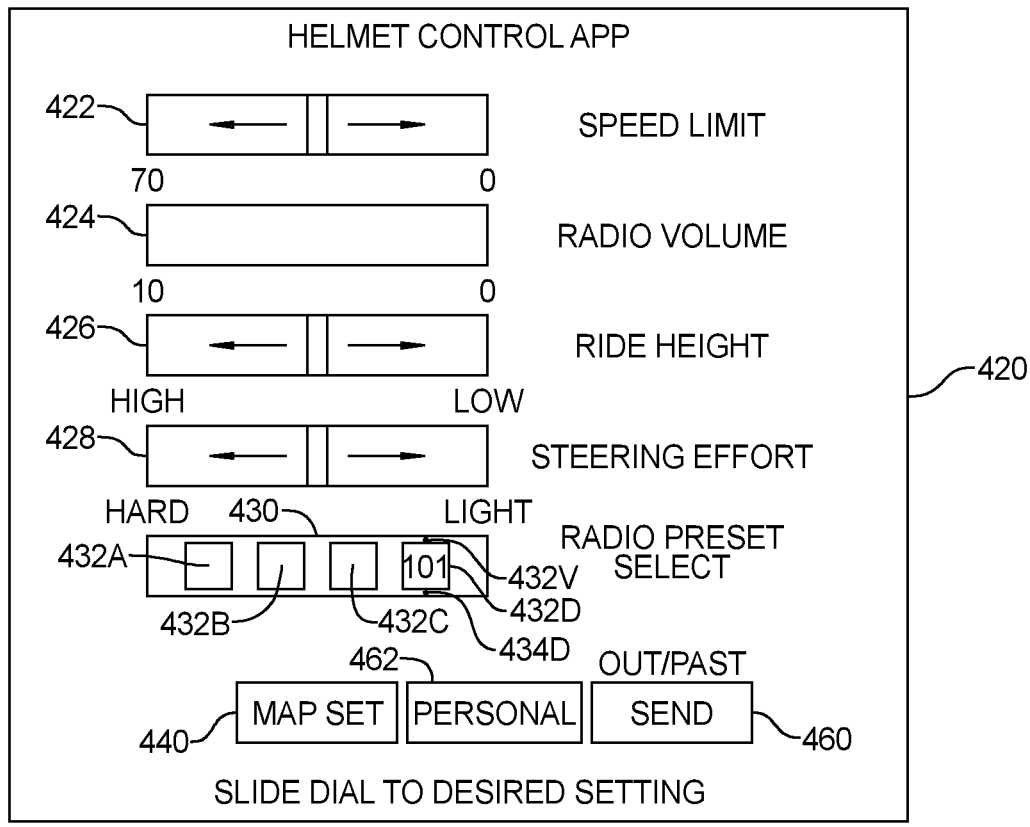
FIG. 4C is a helmet control screen display for initiating various function settings.

Referring now to FIG. 4C, the helmet function settings control application may provide a user interface 420 used for enabling various limitations for operating the vehicle. The use of application 340 may disable function settings from the helmet. The limitation application 340 illustrated in FIG. 3 may allow various controls to be preset for the vehicle and ultimately store within the helmet. By setting the limitations, parental controls may be provided. Further, adults may also benefit from this system by presetting various settings within the vehicle. In this example, the speed limit that may be set by a speed limit selector 422. The speed limit selector 422 may be moved by buttons within the user interface 324 or by touching the screen display on a touchscreen display. All of the selectors set forth below may be changed by the user interface or by touching the touchscreen display depending on the design of the system. The user interface 420 may be displayed on a screen display after the user has entered the user identifier to access the control app.

A volume selector 424 may also be provided. The volume selector 424 may set a maximum allowed volume for the radio or audio output of the vehicle.

A ride height selector 426 may also be provided. The ride height selector 426 may set the suspension preloads so that a predetermined ride height may be provided for the user. Different uses of the vehicles such as loading of the vehicle and different weights of the passengers may deem desirable the change of a ride height according to a user's preference.

A steering effort selector 428 may also be provided in the system. The steering effort selector 428 may change the amount of steering effort that must be applied to the steering wheel in order to turn the steering wheel.

A radio preset selector 430 may provide various numbers of preset radio station frequencies that may be selected or changed. The preset selector 430 may have individual selection control buttons 432A, 432B, 432C and 432D. By touching one of the individual radio selector buttons 432A-D, the frequency of the radio may be preselected. In this example button 432D is selected and arrows 434D and 432U are provided and correspond to an up frequency or down frequency selection. The frequency may be displayed within the selector button 432D or adjacent to the button 432.

Figure 4D:
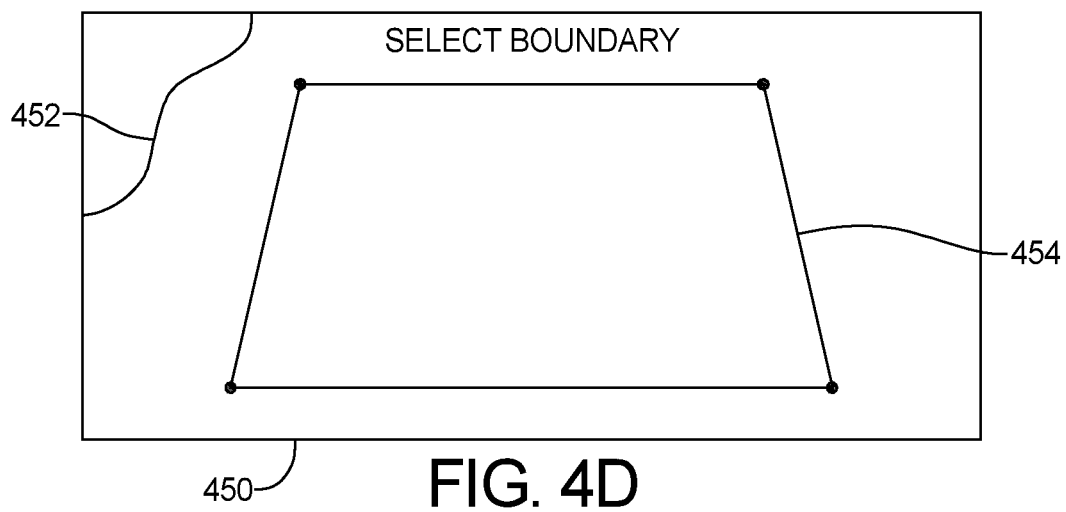
FIG. 4D is a screen display for setting geographic boundaries.

A maps set selector 440 may also be provided within the user interface 420. The maps set selector 440 may initiate a screen illustrated in FIG. 4C. In FIG. 4D a screen display 450 is set forth with a map 452 and a geographical boundary 454 that may be moved by the user interface or by touching the display. The boundary 454 may be changed so that the vehicle may be operated only within a certain geographical boundary.

Referring back to FIG. 4C, a send button 460 may also be provided. The send button 460 may allow the various settings to be communicated to the memory of the programming device 30. The send button 460 may also act to send the functions settings to the transmitter 312 where they may be transmitted to the helmet control system of the helmet 20 of FIGS. 1 and 2. A personal button 462 may also be included within the user interface 420. The personal button, when selected, brings up the screen display illustrated in the user interface 470 of FIG. 4E.

Figure 4E:
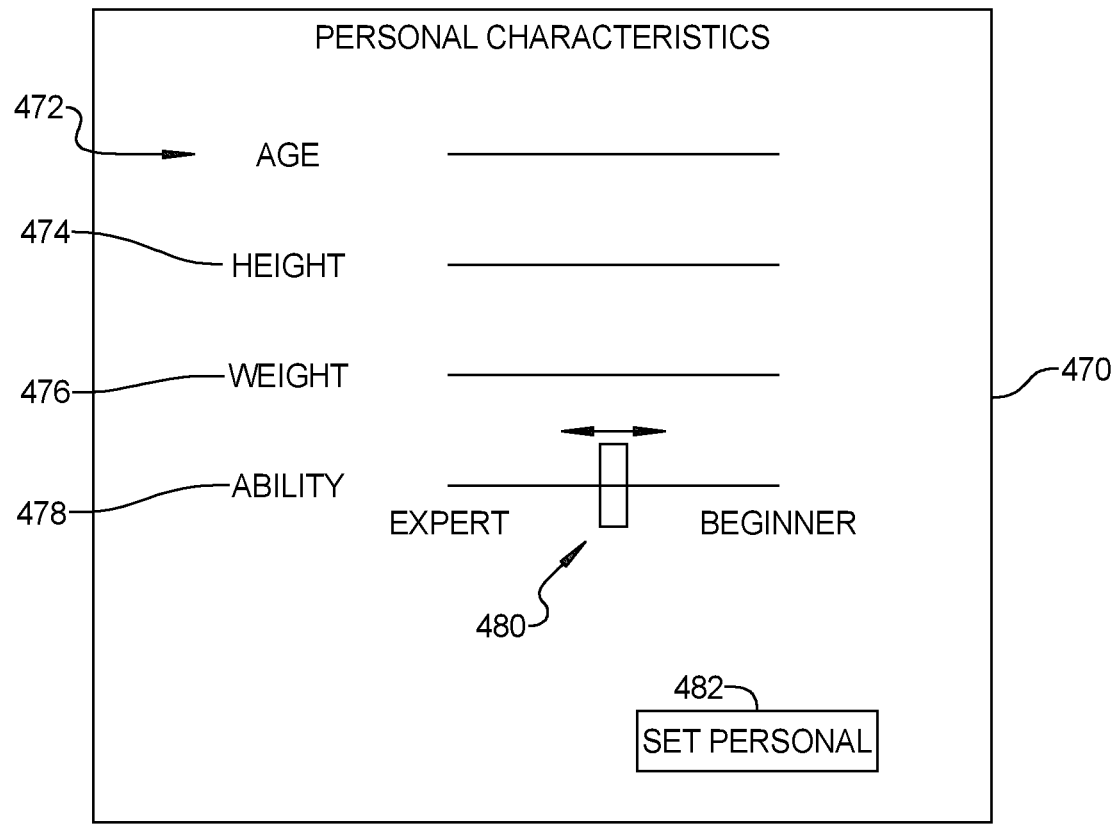
FIG. 4E is a screen display for setting personal characteristics.

Referring now to FIG. 4E, a personal characteristics user interface 470 is provided. In this example various personal characteristics for a rider may be set. Menu selection 472 allows the operator to select the age. Menu selection 474 allows the operator to select the height of the rider. Menu selection 476 allows the weight of the rider to be selected. The age, height and weight may all be numerically typed in. However, slide dials, buttons or other types of user interface may also be used to select the appropriate age. Menu selection 478 may also allow the ability of the rider to be set. A slide dial 480 may be used to set the level from expert to beginner for a particular rider. After the personal settings are selected button 482 may be set the personal settings for a particular user. The personal settings may be ultimately communicated to a helmet to be stored therein and ultimately communicated to a vehicle.

Figure 5:
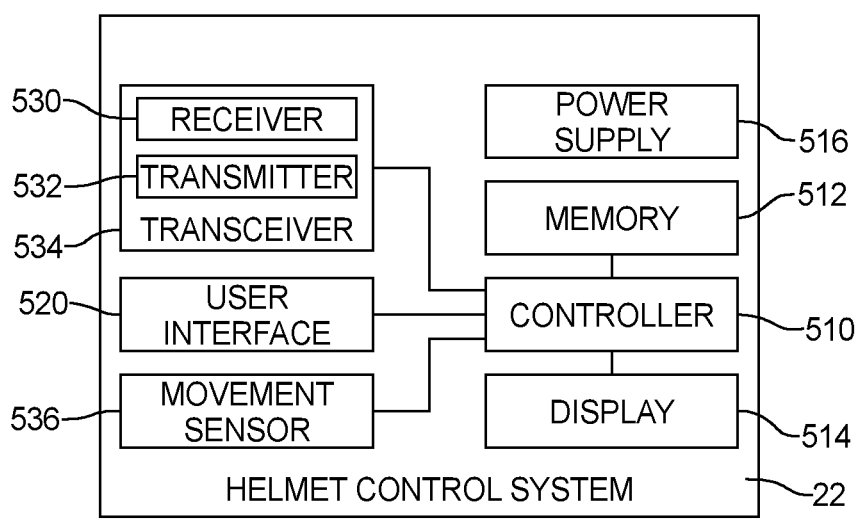
FIG. 5 is a block diagrammatic view of the helmet control system according to the present disclosure.

Referring now to FIG. 5, the helmet control system 22 is illustrated in further detail. The helmet control system 22 includes a controller 510 that is in communication with a memory 512. The memory 512 may be a solid state device. The controller 510 may also be coupled to a display 514. The display 514 may be a simple indicator such as an LED or multiple LEDs to communicate that various functions have been performed. A power supply 516 such as a battery may also be provided within the helmet control system 22. The controller 510 may be coupled to a user interface 520. The user interface 520 may be one or more buttons, arrows or other types of selectors for controlling the function of the controller 510. For example, the user interface 520 may be used for changing the helmet control system 22 to an active state where it receives the function settings from the application.

The controller 510 is coupled to a receiver 530 and a transmitter 532. The receiver 530 and the transmitter 532 may be incorporated within a transceiver 534 as one unit. The receiver 530 may be used to receive signals from the programming device either directly or through a network. The transmitter 532 may be used to transmit function settings stored within the memory 512 to the vehicle function controller 16.

A movement sensor 536 is also in communication with the controller 510. The movement sensor 536 generates a movement signal that corresponds to the movement of the helmet. The movement sensor 536 may be one of a various number of different types of sensors including a piezoelectric sensor, an accelerometer, or the like. The movement sensor signal is communicated to the controller 510 and, as will be described in more detail below, may initiate a pairing process between the helmet and the vehicle.

Figure 6:
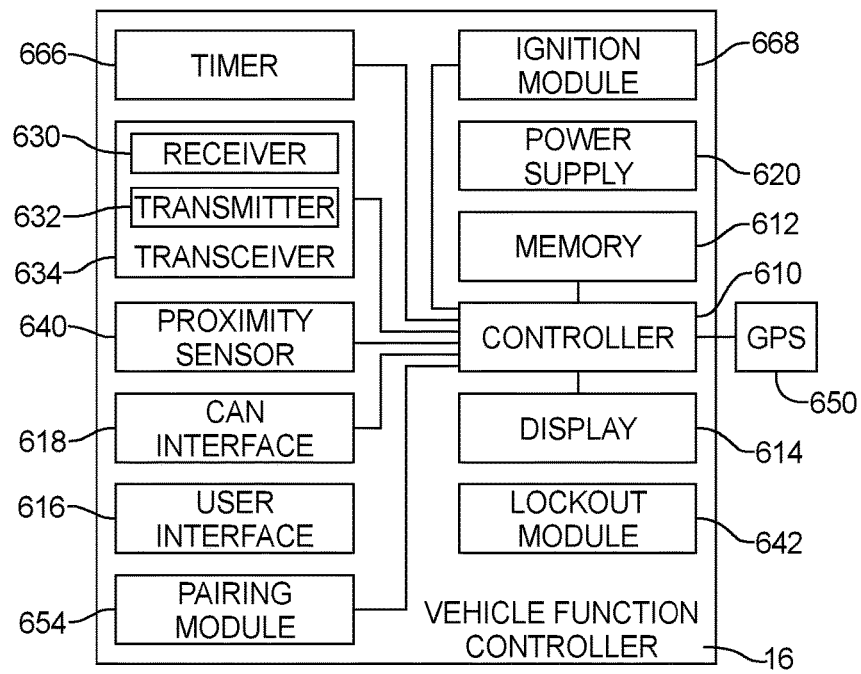
FIG. 6 is a block diagrammatic view of a vehicle function controller.

Referring now to FIG. 6, the vehicle function controller 16 is illustrated in further detail. The vehicle function controller 16 may include a controller 610 that is in communication with a memory 612 for storing various function settings therein. The controller 610 may be a microprocessor, an integrated circuit or discrete circuit. The function settings may be saved until the function settings are changed by communicating with the helmet control system 22 of FIGS. 1, 2 and 5. The controller 610 may be in communication with a display 614. The display 614 may be used to display various RIDE COMMAND® functions for user selectability. The RIDE COMMAND® system may be used for the vehicle function controller. The RIDE COMMAND® system has various capabilities that are enhanced by the present examples. The function settings may set maximum or minimum settings for various types of functions. As long as the selected functions are in between the display or the user interface 616 may be used to adjust the various functions settings. The controller 610 may also be in communication with a controller area network (CAN) interface 618. The controller area network interface 618 may be used to communicate signals to the various vehicle systems such as a suspension system, steering system, a braking system or the like. The display 614 may also provide indicators to warn the vehicle operator that they are attempting to operate outside the various parameters.

The vehicle function controller 16 may incorporate the functions of the programming device 30 and the application 32 therein. In this manner the programming device 30 may be integral to the function controller 16 and may be displayed through the display 614. The RIDE COMMAND® system may incorporate the application 32. Of course, the application 32 for changing settings could be password protected to prevent unauthorized changes (e.g., parental controls).

A power supply 620 may be used to power the vehicle function controller. The power supply 620 may be a vehicle battery.

The controller 610 may also be in communication with a receiver 630 a transmitter 632 both of which may be incorporated into a transceiver 634. The receiver may be used to receive the signal from the helmet control system 22 when the helmet is proximate to the vehicle. The system may be activated by a key or by a proximity sensor 640 which is coupled to the controller 610. That is, the controller 610 may provide a low power beacon signal through the receiver 630 to sense the approach of a helmet control system 22 which in turn may generate a response signal that provides the function settings to the controller 610 and ultimately that to be stored within the memory 612. The vehicle may be limited from starting or may get a low top speed. A proximity sensor 640 may also generate a signal to recognize that the helmet is within in a certain proximity of the system. The proximity sensor 640 may, for example, be a motion sensor to detect motion nearby the vehicle or within the passenger compartment of the vehicle to which in turn activates the controller 610 to power the receiver 630 to receive the function settings. The proximity sensor 640 may be a key press or button press to turn on the vehicle as well. This indicates that the vehicle operator is within the vehicle and thus proximate to the proximity sensor 640.

A lockout module 642 may also be included in the vehicle function controller. The lockout module 642 allows the vehicle to not start unless a properly authorized helmet is provided. The helmet communicates an identifier to the vehicle function controller and thus the lockout may be disabled when a helmet is positioned close to the vehicle or in the riding positon of the vehicle.

A global positioning system receiver (GPS) 650 communicates a global position to the controller 610. The global position signal from the global position system 650 corresponds to a coordinate position of the vehicle.

A pairing module 654 is coupled to a controller 610. The pairing module 654 controls the pairing process of the helmet with the vehicle according to the method set forth below. In particular, the pairing module 654 together with various inputs from the vehicle controller and the helmet allow the helmet and the vehicle to communicate through their respective transmitters/receivers. A timer 666 is used to time various functions such as a time out function or a function such as keeping track of an amount of time since an ignition of the vehicle.

An ignition module 668 generates an ignition signal that corresponds to a starting or turning-on of the vehicle. The ignition module 668 may, for example, generate an ignition signal in response to a key rotating in an ignition lock. The ignition module 668 may also be in communication with a push button type system that generates an ignition signal in response to the push of a button. The timer 666 may be used to time a time since the ignition module 668 was activated and the ignition signal was generated.

Figure 7:
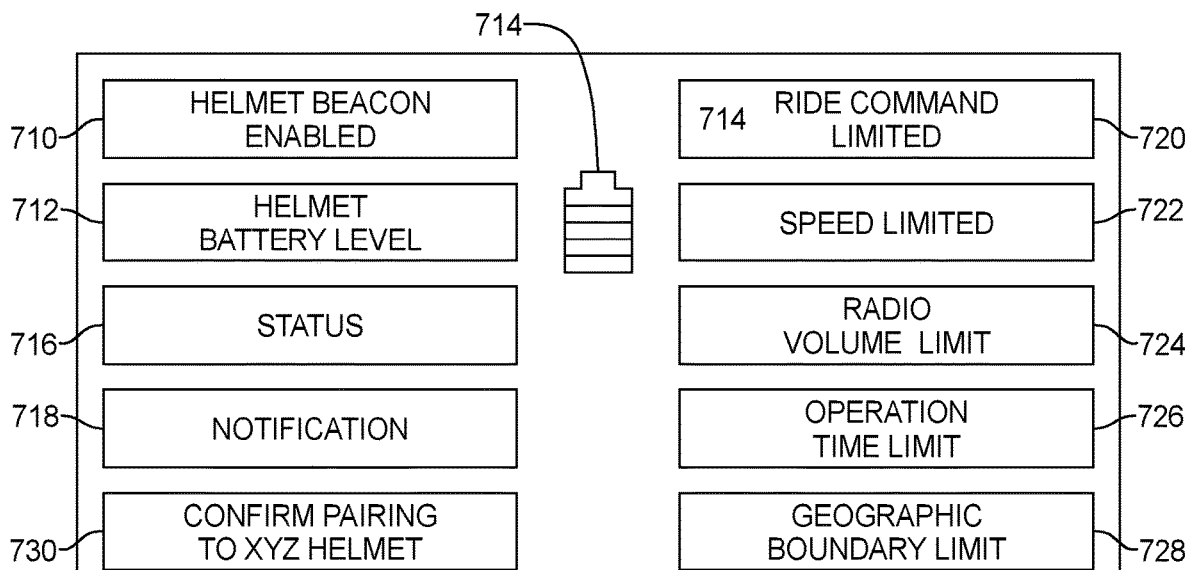
FIG. 7 is a block diagrammatic view of a screen display for the vehicle function controller.

Referring now to FIG. 7, the display 614 of the vehicle function controller is set forth in one example. The display 614 may display or indicate various functions have been activated. In this example, a helmet beacon enabled indicator 710 illustrates that the helmet beacon has been communicated with by the vehicle function controller. The helmet battery level indicator 712 may indicate the battery level of the helmet by word descriptors or by an indicator 714 that represents a battery being full or partially full. A status indicator 716 may be used to indicate the status of various functions of the system. A notification indicator 718 may indicate that a notification from the helmet control system 22 is being received. A RIDE COMMAND® indicator 720 may be used to indicate that the RIDE COMMAND® is limited by various functions. A complete lockout of starting may be performed without an authorized helmet. A speed limited indicator 722 may be activated or illuminated when the speed of the vehicle has reached the command setting. A radio volume limited indicator 724 may be illuminated or activated when the radio volume is attempted to be set over the preset functions settings. An operation time limited indicator 726 may provide an indicator that the amount of time or the time of day is beyond the time of day for operation of the vehicle. A geographical indicator 728 may indicate that the geographical boundary of the vehicle may have been exceeded. This may be performed by the operation of the GPS 650 of the vehicle as set forth in FIG. 6.

The display 614 may act as a user interface as described above when the display 614 is a touch screen display. A confirmation indicator 730 may be illuminated to allow the vehicle operator to confirm the pairing of the vehicle and the helmet. The confirmation indicator 730 may display wording such as "confirm pairing to XYZ helmet". "XYZ" refers to an identifier of the helmet. The identifier may be a name or other alphanumeric identifier. When pairing is desired, the user operator may select the confirmation indicator 730 and the helmet and the vehicle will be able to communicate various signals therebetween. The confirmation indicator 730 may continue to be illuminated, change the wording thereof or disappear after the helmet and the vehicle are paired an intercommunicating.

Figure 8:
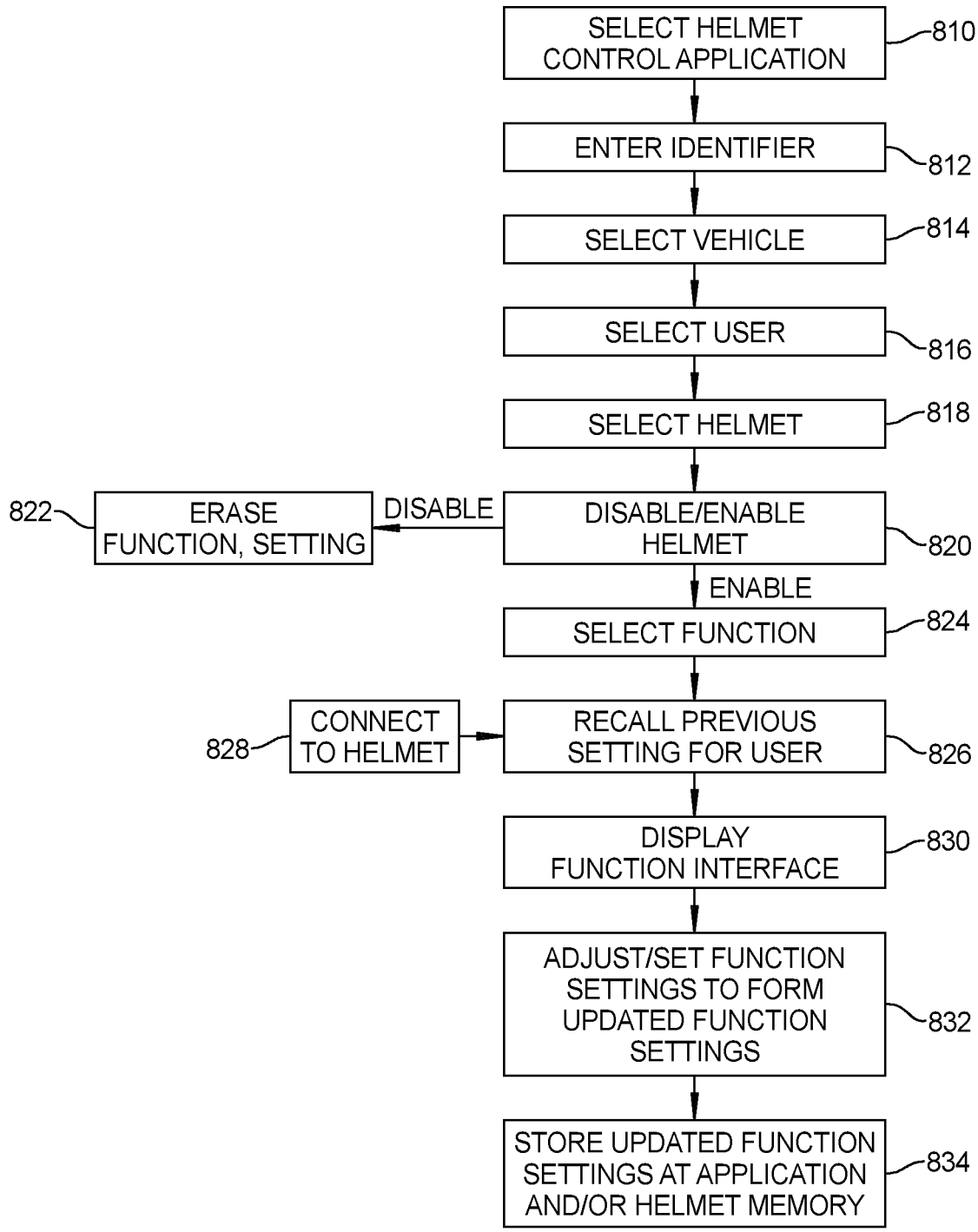
FIG. 8 is a flowchart of a method for setting the vehicle settings at an application for a programming device.

Referring now to FIG. 8, a method for operating the system between the programming device 30 and the helmet 20 is set forth. In this example, the helmet control application is selected at the programming device in step 810. This may be selected by clicking on an icon, selecting an icon from a screen or interfacing with a user interface such as arrow keys and a select button. In step 812 an identifier identifying the user of the application may be set forth. The identifier may be entered once and saved within the user device.

In step 814 a vehicle may be selected from a user interface. That is, multiple vehicles may be associated with a single user. In step 816 the user may be selected. Multiple users may also be associated with a particular account. For example, the owner of the vehicle may have desired settings for kids and spouses as well as friends. In step 818, multiple helmets may also be associated in an account. In this step, the desired helmet to be programmed may be selected. After step 820 a disable/enable function may be performed for the helmet or user. If disable is selected, the previously stored functions of the helmet may be deleted. In step 820 if enable is selected step 824 is performed. In step 824 the user interface illustrated above with respect to FIGS. 4A-4C may be used to select various functions. In step 826 previous function settings may be recalled. The function settings may be recalled from the application or the memory associated with the programming device or by connecting to the helmet in step 822.

In step 830 various functions may be desired to be limited. A function interface may be displayed. The functional interface may change depending on the user or type of user. For example, various age levels of children may have different types of functions limited. For other adult users other types of functions may be set.

In step 832 the user interface associated with the programming device is used to adjust or set the functional settings to form updated function settings. The updated functions settings are stored in step 834 at the application and or at the helmet memory. As indicated above a store button may be selected so that the settings are stored within the programming device and or the helmet or both.

Figure 9:
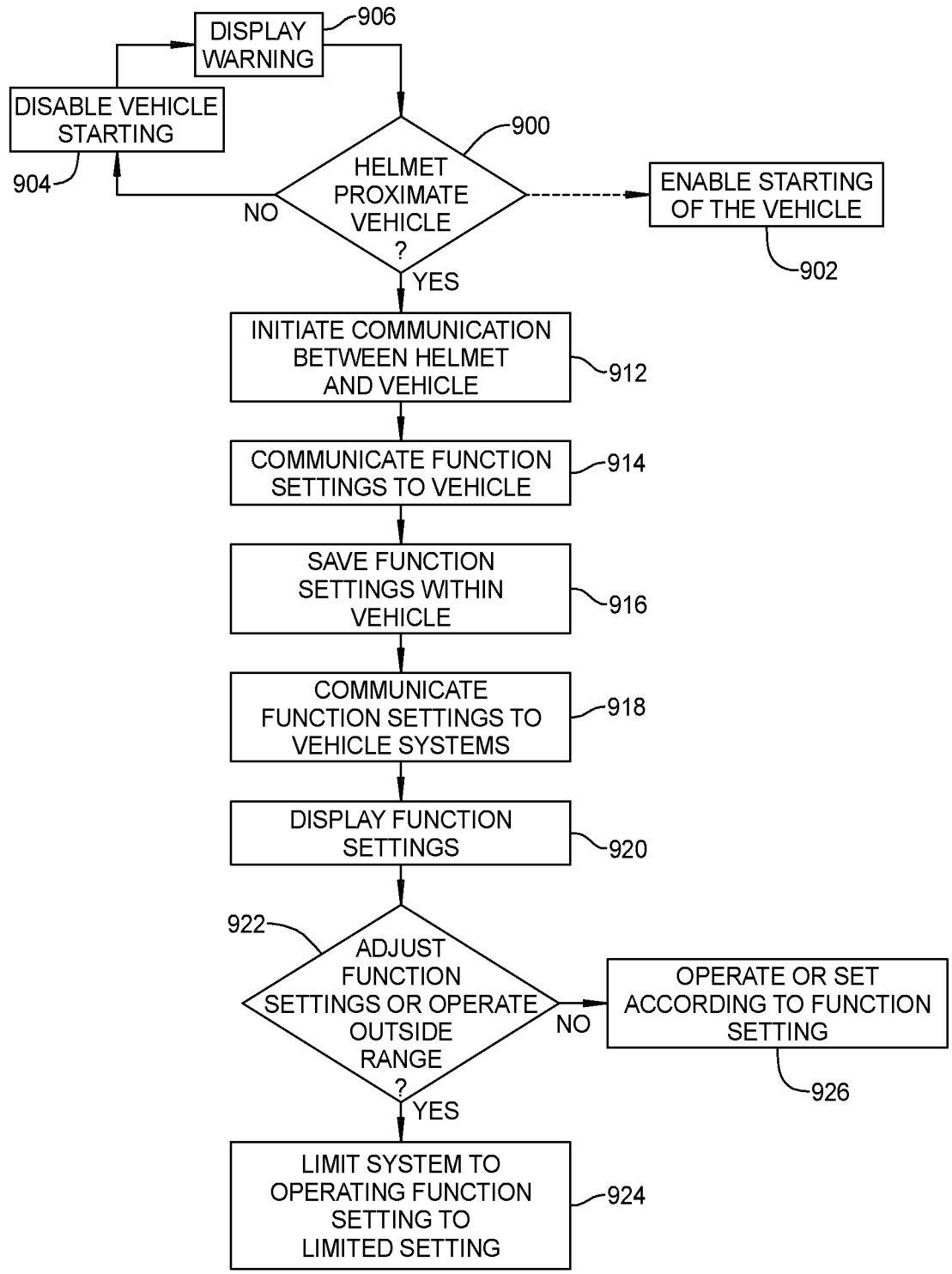
FIG. 9 is a flowchart of a method for operating a vehicle and communicating function settings from a helmet to a vehicle function controller.

Referring now to FIG. 9, a method for communicating the function settings to the vehicle is set forth. In step 900 it is determined whether the helmet is proximate to the vehicle. As mentioned above a proximity sensor may detect the proximity of the helmet to the vehicle. The proximity may also be determined when a key is activated within the ignition of the vehicle.

In the simplest form, step 902 may enable the starting of the vehicle when the helmet is proximate to the vehicle. The helmet communicates an identifier to the vehicle controller. The identifier may identify the helmet as a helmet to allow starting. The vehicle controller may also identify the identifier as authorized. Therefore, unless the helmet/identifier is authorized the vehicle will not start. That is, when a helmet without an identifier is not present, step 904 may disable the vehicle from starting. Alternately, starting may be allowed but a very low top speed may be set to allow the vehicle to be moved. In step 906 may display a warning that a helmet is not present and the vehicle will not start unless a helmet is present. After step 900, step 912 initiates communication between the helmet and vehicle function controller 16. Function settings stored within the helmet may be communicated to the vehicle by way of an RF interface, Bluetooth®, or secure access interface.

In step 916 function settings may be stored within the vehicle. That is, the function settings from the helmet may be stored within the memory of the vehicle function controller 16.

In step 918 the function settings are communicated to the vehicle. The controller illustrated in FIG. 6 may control various functions or the functions may be communicated through the controller area network 618 to various other controllers that control such functions as a power steering unit, a ride height controller or the other types of controllers or functions described above.

In step 920 the function settings may be displayed in the screen display illustrated in FIG. 6.

In step 922 it is determined whether the function settings have been adjusted or are operating outside the range. If the function settings are operating outside the range or attempts to operate the vehicle outside of the range step 924 limits the system to operate using the function settings to limit the operation of the vehicle. In step 922 when the system is operating within the range the vehicle is operated according to the function setting or according to the operation of the vehicle as long as the vehicle is being operated within the limits of the function setting.

Figure 10:
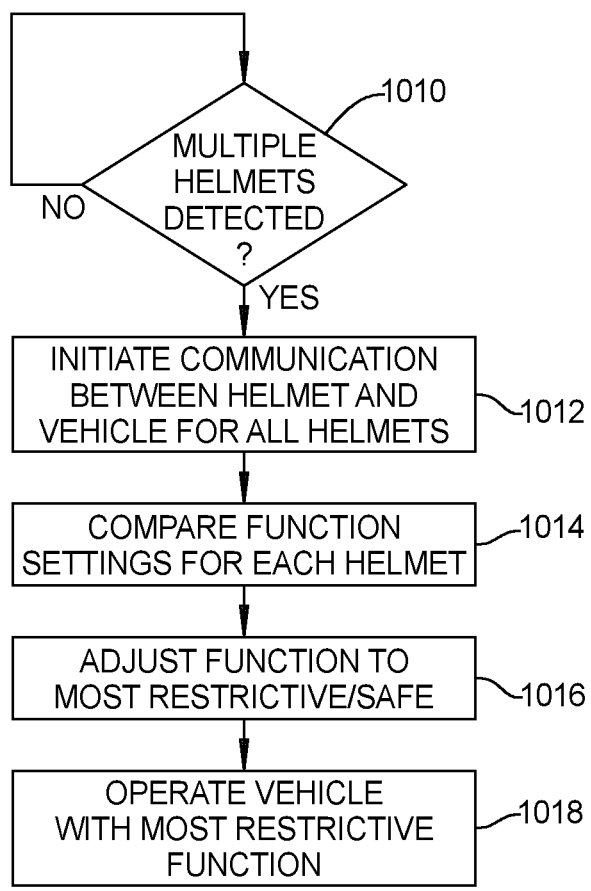
FIG. 10 is a flowchart of a method for operating using multiple helmets.

Referring now to FIG. 10, a method for operating the vehicle when multiple helmets are detected. In step 1010 the system detects multiple helmets. In step 1012 communication is initiated between the helmet and the vehicle for all the helmets nearby. In step 1014 the function settings for each helmet are communicated to the vehicle controller. In step 1016 the functions are adjusted to the most restrictive or the safest function or functions. In step 1018 the vehicle is operated with the most restrictive functions.

Figure 11:
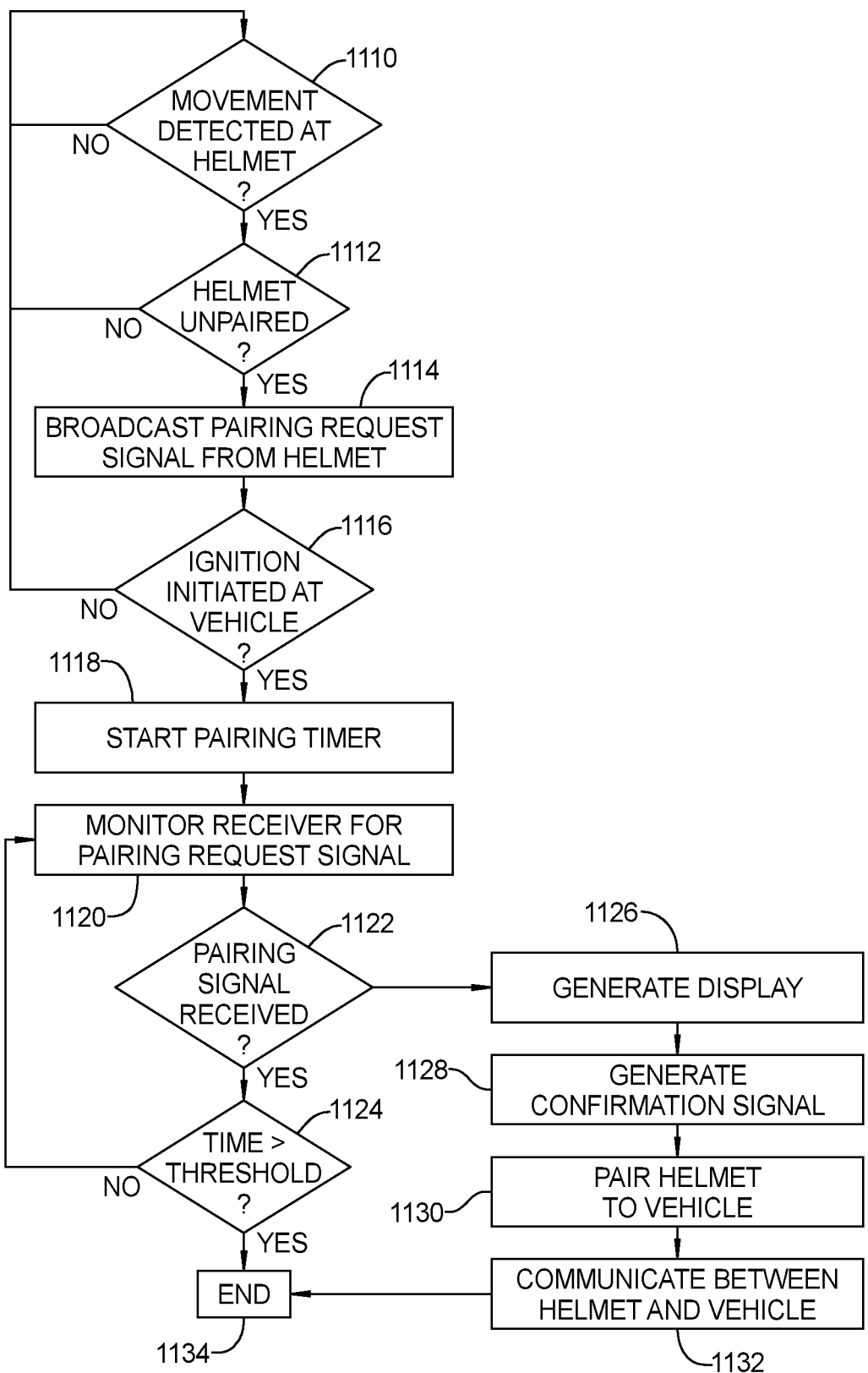
FIG. 11 is a method for initiating the pairing of a helmet to a vehicle.

Referring now to FIG. 11, a method of initiating the pairing of a helmet to a vehicle is set forth. While the "helmet" and the "vehicle" are described, the pairing is between a transceiver of the vehicle and a transceiver of the helmet. In step 1110, movement of the helmet is detected at the controller of the helmet control system. Movement is detected from a movement sensor that generates a movement signal. In step 1110, if movement is not detected the system repeats at step 1110. In step 1110, if movement is detected in response to the movement signal, step 1112 is performed. Step 1112 determines if the helmet is unpaired. When the helmet is not unpaired, meaning that the helmet is paired, step 1110 is again performed. In step 1112, if the helmet is unpaired, step 1114 is performed. In step 1114, a pairing request signal is communicated from the transceiver of the vehicle. The pairing request signal may include such things as an identifier of the helmet. Other types of communication data may also be included such as a communication frequency, a key for communication, an encryption scheme or the like. After step 1114, step 1116 determines if the ignition of the vehicle is initiated. As mentioned above, the ignition is initiated by such things as a lock cylinder being rotated or a button being pushed to start the vehicle when the vehicle is started and ignition signal is generated. In step 1116, it is determined whether the ignition has been initiated. If the ignition has not been initiated, step 1110 is again performed. When the ignition has been initiated, step 1118 initiates the pairing timer which corresponds to a maximum time that the system is allowed to perform pairing. The pairing timer may be a countdown timer or may be a limit that is set for an amount of time that the vehicle will "look" for a pairing request signal. In step 1120, the receiver of the transceiver of the vehicle is monitored for a pairing request signal. When a pairing signal is not received in step 1122, step 1124 determines whether the time has been exceeded such as when a time exceeds a threshold. The time corresponds to the timer initiation of step 1118. Steps 1120 and 1122 are again repeated when the time threshold has not been exceeded.

Referring back to step 1122, when the pairing signal is received, step 1126 generates a screen display at a user interface such as the confirmation indicator 730 illustrated in FIG. 7. In step 1128, the user may interface with the user interface and a confirmation signal may be generated at the user interface in step 1128. After the confirmation signal is generated at the user interface, it is communicated to the controller 610 of the vehicle. In step 1130, the helmet is paired to the vehicle. That is, as mentioned above, the helmet transceiver is able to communicate with the vehicle transceiver. Details of the pairing process are described in FIG. 12.

After step 1130, step 1132 allows communication signals to be transmitted between the helmet and the vehicle. After step 1124 and after step 1132, the process ends in step 1134.

Figure 12:
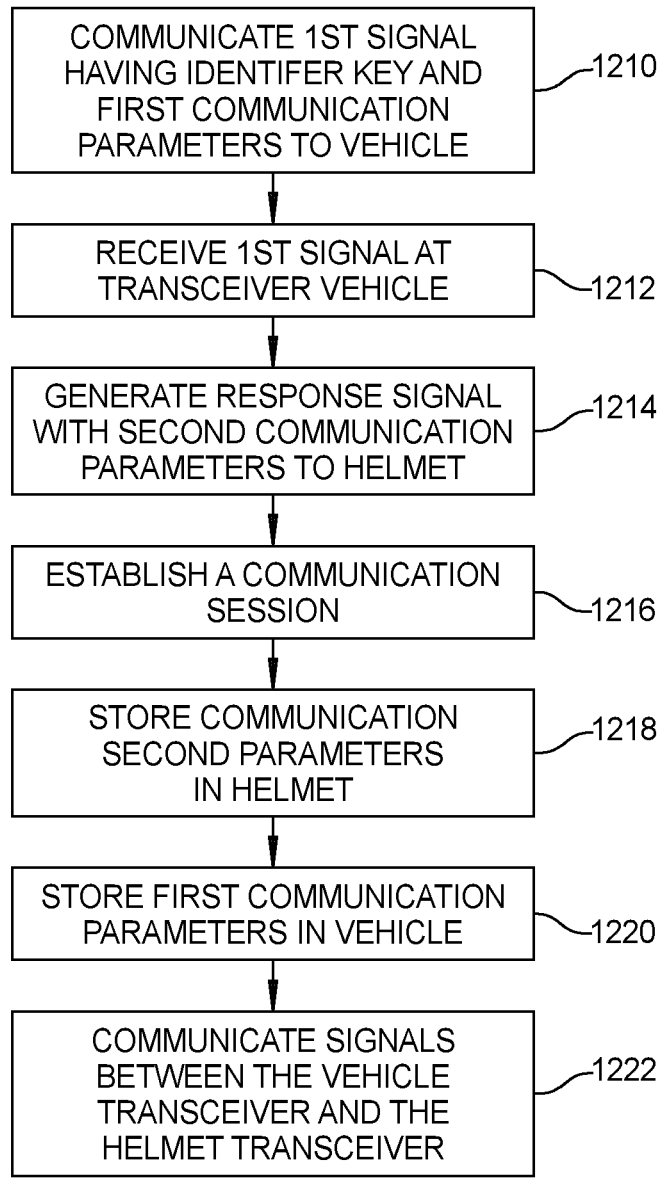
FIG. 12 is a detailed flow chart of the method of pairing.

Referring now to FIG. 12, details of the pairing process are set forth. In step 1210, a first signal such as the pairing request signal is communicated from the helmet such as in response to a movement of the helmet as described above. The first signal may have an identifier key and communicate various parameters such as a frequency, a key, or other type of encoding or encryption data. The first parameters allow the helmet transceiver to communicate with the vehicle transceiver. In step 1212, the first signal is received at the transceiver of the vehicle. In particular, the receiver portion of the transceiver receives the first signal and the parameters therein. The transceiver "looks" for the signal as described in FIG. 11. In step 1214, a response signal is generated with a second communication signal parameter to the helmet. The second communication parameters may include an acknowledge signal, an enable signal and other parameters for intercommunicating between the vehicle and the helmet. Passwords or numerical keys may be exchanged with the first communication signal and the second communication signal. Once the communication signals are exchanged, a communication system is established in step 1216. This is referred to as pairing which allows the vehicles to exchange signals. For example, the helmet may communicate presettings for the vehicle. The vehicle, may transmit various data from the vehicle to the helmet. In step 1218, the second communication parameters are stored in the helmet. In step 1220, the first communication parameters are stored in the vehicle. In step 1222, various other types of signals are communicated between the helmet and the vehicle. More specifically, various types of data signals may be exchanged between the transceiver of the helmet and the transceiver of the vehicle.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

The invention claimed is:

1. A system comprising:
 a programming device comprising an application for programming vehicle function settings of a vehicle, said programming device comprising a transmitter communicating the first vehicle function settings for first helmet associated with a first device identifier and second vehicle function setting for a second helmet associated with the second device identifier through a vehicle receiver to a vehicle controller, said first vehicle function settings and said second vehicle function settings causing the controller to operate the vehicle differently when the first device identifier or the second device identifier is received from a helmet associated with a vehicle user.

2. The system of claim 1 wherein the transmitter communicates using one of Bluetooth, Wi-Fi, short range or long range communications and cellular communications.

3. The system as recited in claim 1 wherein the receiver comprises a Bluetooth® receiver.

4. The system of claim 1 wherein the first vehicle function settings and the second vehicle function settings limit operation of the vehicle in response to the identifier.

5. The system of claim 1 wherein the first vehicle function settings and the second vehicle function settings comprises disabling starting of the vehicle.

6. The system as recited in claim 1 wherein the first vehicle function settings and the second vehicle function settings further comprise at least one of a top speed setting, a radio volume setting and a geographical setting.

7. The system as recited in claim 1 wherein the vehicle comprises a first display displaying the vehicle function settings.

8. The system as recited in claim 7 wherein the programming device comprises a second display displaying a plurality of selectors for changing the vehicle function settings.

9. The system as received in claim 8 wherein the plurality of selectors comprises at least one of a speed limit selector, and a radio volume selector, a ride height selector, a radio preset selector, a map setting selector and a steering effort selector.

10. The system as recited in claim 1 further comprising a proximity sensor generating a proximity signal, said vehicle controller powering the vehicle receiver, in response to the proximity signal.

11. The system as recited in claim 10 wherein the proximity sensor comprises a key press or a button press.

12. The system as received in claim 1 wherein the programming device stores the first vehicle function settings or the second vehicle function settings in the helmet, said helmet stores the first vehicle function settings or the second vehicle function settings therein and communicates the first vehicle function settings or second vehicle function settings to the vehicle receiver.

13. A method comprising:
programming first vehicle function settings and second vehicle function settings of a vehicle using a programming device;
communicating the first vehicle function settings associated with a first device identifier and the second vehicle function settings associated with a second device identifier to the vehicle using a transmitter of the programming device;
receiving the first vehicle function settings and the first device identifier and the second vehicle function settings and the second device identifier at a vehicle receiver disposed within the vehicle;
generating a helmet movement signal at a helmet in response to sensing movement of the helmet, communicating, by the helmet, a helmet identifier corresponding to one of the first device identifier or the second device identifier to the vehicle controller through the receiver in response to the helmet movement signal; and
controlling a vehicle function in response to the vehicle function settings.

14. The method of claim 13 further comprising limiting an operation of the vehicle in response to the helmet identifier and the first vehicle function settings or the second vehicle function settings.

15. The method of claim 13 wherein controlling the vehicle comprises disabling starting of the vehicle, based on the first vehicle function settings or the second vehicle function settings.

16. The method of claim 13 wherein controlling comprises limiting at least one of a top speed setting, a radio volume setting and a geographical setting.

17. The method of claim 13 further comprising generating a proximity signal at a proximity sensor and, powering the vehicle receiver, in response to the proximity signal.

18. The method as recited in claim 17 wherein generating the proximity signal comprises pressing a key or button.

19. The method of claim 13 wherein the programming device comprises a second display displaying a plurality of selectors for changing the vehicle function settings, wherein the plurality of selectors comprises at least one of a speed limit selector, and a radio volume selector, a ride height selector, a radio preset selector, a map setting selector and a steering effort selector.

20. The method of claim 13 further comprising storing the first vehicle function settings or the second vehicle function settings in the helmet, and communicating the function settings to the vehicle receiver.

\* \* \* \* \*